United States Patent [19]

Badagnani

[11] Patent Number: 4,842,457
[45] Date of Patent: Jun. 27, 1989

[54] MACHINE TOOL WITH IMPROVED SPINDLEHEAD MOUNTING AND TRAVERSING MEANS

[75] Inventor: Giuseppe Badagnani, San Giorgio Piacentino, Italy

[73] Assignee: Mandelli S.P.A., Piacenza, Italy

[21] Appl. No.: 84,906

[22] Filed: Aug. 12, 1987

[30] Foreign Application Priority Data

Sep. 10, 1986 [IT] Italy ................... 21657 A/86

[51] Int. Cl.⁴ .................. B23C 1/06; B23B 47/18; F16H 1/18
[52] U.S. Cl. ...................... 400/183; 74/89.15; 408/137; 409/231
[58] Field of Search ............ 409/190, 191, 185, 231, 409/235, 183, 219, 184, 186; 408/129, 137; 29/568; 51/166 MH, 165.8; 74/89.15, 765, 841, 424.8; 83/318

[56] References Cited

U.S. PATENT DOCUMENTS

| 1,475,614 | 11/1923 | Williams | 51/166 MH |
|---|---|---|---|
| 2,882,741 | 4/1959 | Liebmann | 74/424.8 R |
| 3,455,207 | 7/1965 | Meinke | 409/190 |
| 3,640,147 | 2/1972 | Fantoni | 409/185 X |
| 3,665,805 | 5/1972 | Wolf | 409/190 |
| 3,768,364 | 10/1973 | Lancaster et al. | 409/190 |
| 3,803,928 | 4/1974 | Konkal et al. | 83/318 |
| 4,000,661 | 1/1977 | Menzel | 74/89.15 |
| 4,417,422 | 11/1983 | Redeker et al. | 51/50 R |
| 4,449,988 | 5/1984 | Redeker et al. | 51/165.8 |
| 4,510,668 | 4/1985 | Ishida et al. | 409/235 |
| 4,517,853 | 5/1985 | Tani et al. | 74/89.15 |

FOREIGN PATENT DOCUMENTS

| 7014955 | 9/1970 | Fed. Rep. of Germany . |
|---|---|---|
| 2331347 | 1/1975 | Fed. Rep. of Germany . |
| 3248004 | 7/1983 | Fed. Rep. of Germany . |
| 3524879 | 7/1986 | Fed. Rep. of Germany . |
| 57-149132 | 9/1982 | Japan . |
| 2127332 | 4/1984 | United Kingdom ............. 409/184 |

OTHER PUBLICATIONS

"Entwicklung schwerer bahngesteuerter Fras-und Bohrwerke", *Werkstatt Und Betrieb*, 107 (1974) 7, By C. Ramusino et al., pp. 387-390.

*Primary Examiner*—William Briggs
*Attorney, Agent, or Firm*—Young & Thompson

[57] ABSTRACT

A machining center or machine tool comprises a bed, structure to support and position the workpieces, and a rotary spindle fed with worktools by an automatic tool changer and carried by a spindlehead which also carries the driving motor therefor. The spindlehead moves back and forth along a rectilinear path under the control of a circulating-ball screw and nut assembly, the screw of which is rigid with the spindlehead and has its axis intersecting that of the spindle. The lead nut of the same assembly is caused to rotate by a motor and is kept axially fixed.

4 Claims, 3 Drawing Sheets

MACHINE TOOL WITH IMPROVED SPINDLEHEAD MOUNTING AND TRAVERSING MEANS

BACKGROUND OF THE INVENTION

The present invention relates to a machining centre for high-precision mass production machining, but can also be applied to a precision machine tool.

More specifically, the present invention relates to an improved arrangement of the spindlehead mounting and traversing means of a machining centre or machine tool, the purpose of which is to provide greater overall rigidity and therefore obtain higher precision in mass-production machining.

The spindlehead of a precision machine tool or machining centre is currently mounted to move back and forth along a rectilinear (generally vertical) path under the control of a circulating-ball screw and nut assembly. Up to the present time, the nut of this assembly, associated with the spindle saddle, has always been kept fixed whereas the screw which passes through the saddle has been made to rotate.

Although this method is constructionally more simple in addition to being obviously more immediate, it has however the not inconsiderable drawback that the spindlehead feed force is necessarily displaced from the centre of gravity of this head by some distance (in this respect, the centre of gravity of the spindlehead lies on the spindle axis in a position corresponding with the shaft which rotates the spindle, so that it is not possible for the screw of the head traversing assembly, which passes through the head itself, to also pass through its centre of gravity) and this drawback has various negative consequences in terms of the stressing of the machine parts, their rigidity and the consequent machining precision obtainable.

SUMMARY OF THE INVENTION

The present invention obviates all these problems by providing a machining centre or machine tool of the type comprising a bed, means to support and position the workpieces, and a rotary spindle fed with worktools by automatic tool-change means and carried by a spindlehead which also carries the driving motor therefor, wherein said spindlehead moves back and forth along a rectilinear path under the control of a circulating-ball screw and nut assembly, characterized in that the screw of said assembly is rigid with the spindlehead and has its axis intersecting that of the spindle, and in that the lead nut of the same assembly is caused to rotate by motor means and is kept axially fixed.

Preferably in this machining centre or machine tool, the screw axis of the screw and nut assembly controlling the spindlehead passes through the point at which the resultant of all the forces and reactions applied to the spindlehead acts, or in close proximity to said point.

BRIEF DESCRIPTION OF THE DRAWINGS

The invention is described in greater detail hereinafter by way of example with reference to a preferred embodiment thereof, illustrated on the accompanying drawings, in which.

DESCRIPTION OF THE PREFERRED EMBODIMENT

Figure 1:
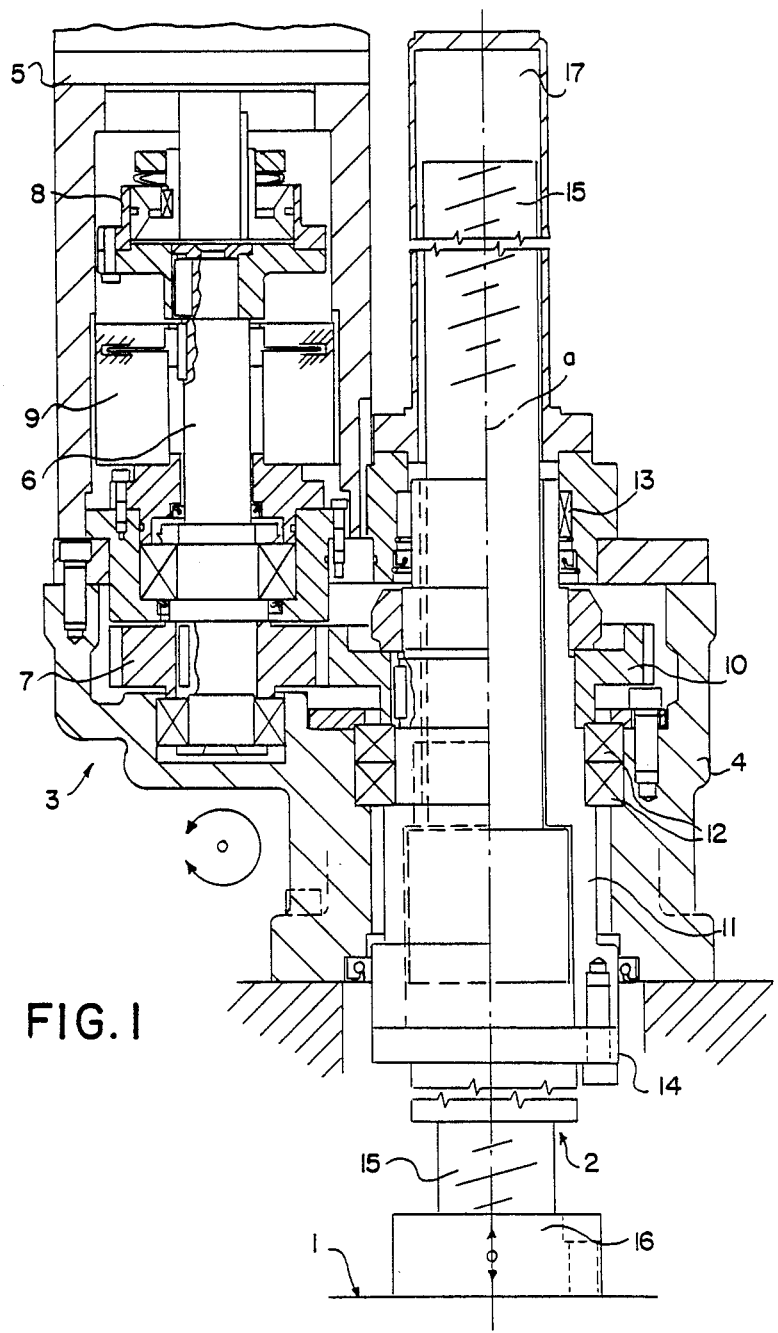
FIG. 1 is a section through part of a machining centre or machine tool comprising the spindlehead traversing means, said means being constructed in accordance with the invention.

With reference to the drawings, a machining centre or machine tool according to the invention comprises a spindlehead 1 mobile vertically with to-and-fro motion, a circulating-ball screw and nut assembly 2 with its vertical axis a disposed along the centre line of the guides for said head, in order to produce said motion, and drive means 3 for said assembly.

A machine support 4 houses a direct current motor 5 which drives a gearwheel 7 by means of a shaft 6. The reference numerals 8 and 9 indicate a torque limiting joint and an electromagnetic brake forming part of the motor unit. The gearwheel 7 engages a gearwheel 10 keyed to a lead nut support sleeve 11 of the screw and nut assembly 2, which is also mounted in the support 4 and is rotatable about the axis a by virtue of bearings 12, 13, the first of which are of the oblique-contact precision type.

The lead nut 14 of the circulating-ball screw and nut assembly 12 is fixed to the sleeve 11. The screw 15 of the same assembly, which is in screwing engagement with the lead nut 14, passes through said sleeve 11 and is disposed along the axis a. The screw 15 is fixed at one end to the spindlehead 1 by a flange 16, has its axis passing through the centre of gravity of said head, and is housed at its opposite end in a suitable seat 17 of the support 4.

The spindlehead 1 is made to traverse by causing the shaft of the motor 5 to rotate.

The movement is transferred to the joint 8, to the shaft 6 and, by way of the gearwheel pair 7, 10, to the sleeve 11 which in its turn rotates the lead nut 14 of the circulating-ball screw and nut assembly 2.

As the sleeve 11 is prevented from moving axially of the support 4 because of the bearings 12, the rotation of the lead nut 14, which is rigid with the sleeve 11, results in axial movement of the ball screw 15 which is connected by the flange 16 to the spindlehead 1. This therefore traverses upwards or downwards according to the direction of motion of the motor 5.

It is important to note that the screw 15 is fixed to the spindlehead 1 by means of the flange 16 in such a manner, according to the invention, that the screw axis a—located on the centre line between the guides for the head 1 and passing through the centre of gravity of this latter - passes through the point at which the resultant of all the forces and reactions applied to said head acts. This point of action coincides with the centre of gravity of the spindlehead 1, so that its movements and working positions are obtained under proper conditions of equilibrium. This results in the most convenient stressing conditions for the various machine parts, and a much more rigid overall behaviour, with obvious improvement in the degree of machining precision.

Figure 2:
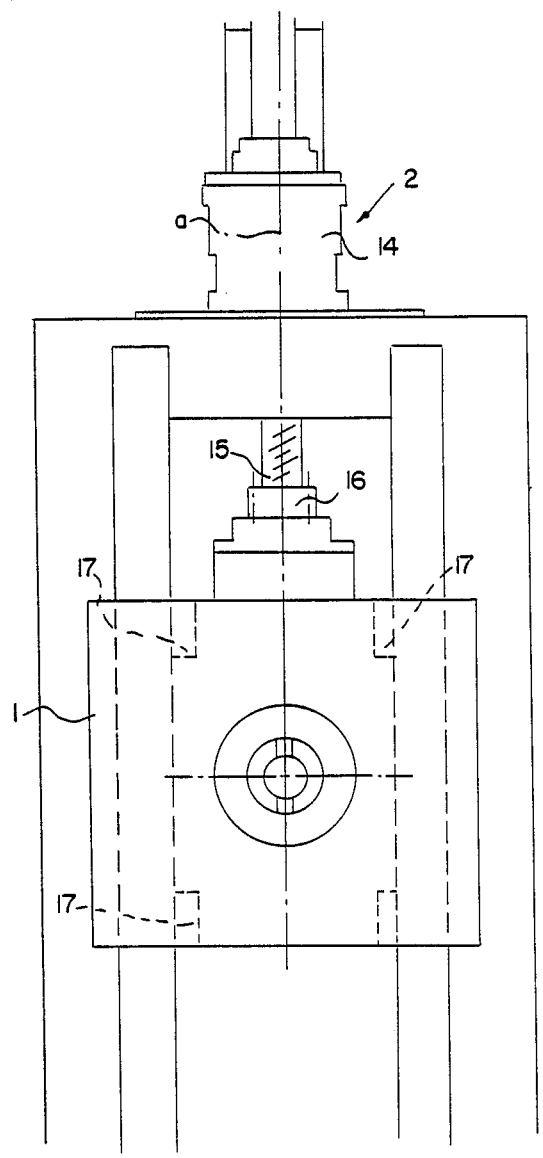
FIGS. 2 and 3 are a front and side view of the spindlehead of the machining centre or machine tool of FIG. 1, and of certain parts of the same machine which are adjacent thereto.
Figure 3:
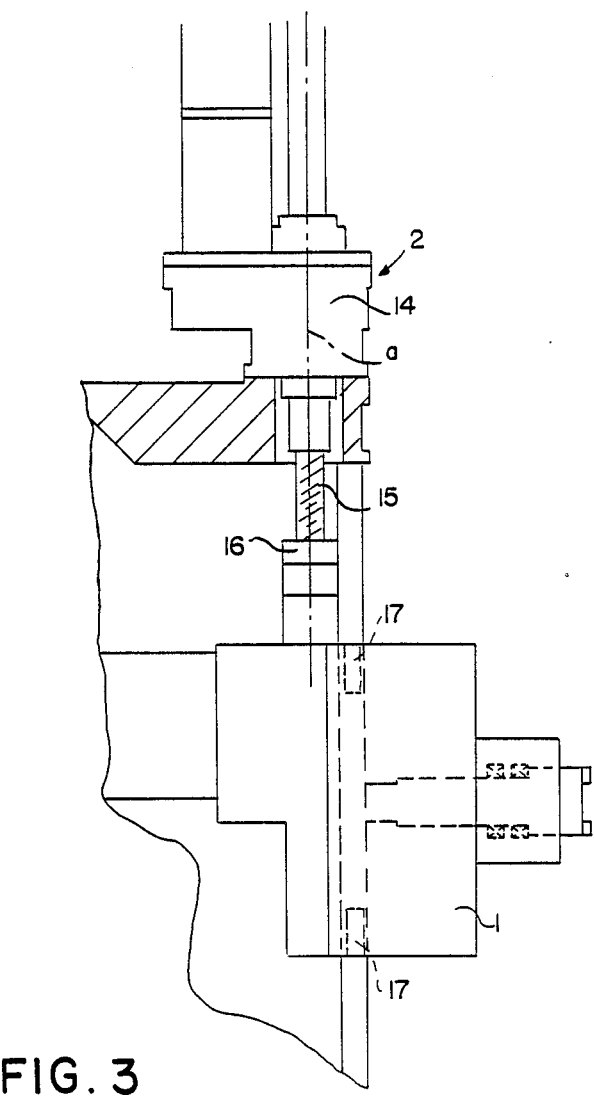

An embodiment such as that described therefore obviates the drawbacks characteristic of known arrangements, and also results in considerable advantages. In this respect:

The feed thrust is transferred directly from the spindle to the workpiece. As the action is aligned with the reaction, no torsional moments arise, and the guide shoes for the head 1 (represented by the reference numeral 17 in FIGS. 2 and 3) are subjected to practically no load by the slide guides.

Any knocking of the spindlehead on reversal of the direction of traverse is eliminated.

The inertia of the assembly moving with the spindlehead is reduced, so making higher acceleration and deceleration possible.

The result, as already stated, is a high degree of overall rigidity, which is also favoured by the use of oblique-contact precision bearings in mounting the sleeve 11 for the lead nut of the circulating-ball screw and nut assembly.

The overall size of the spindlehead is substantially reduced. In this respect, with the arrangement shown, the ball screw 15 is fixed external to the spindlehead 1, and consequently the total internal space of the head 1 is defined only by the components which transmit rotary motion of the spindle.

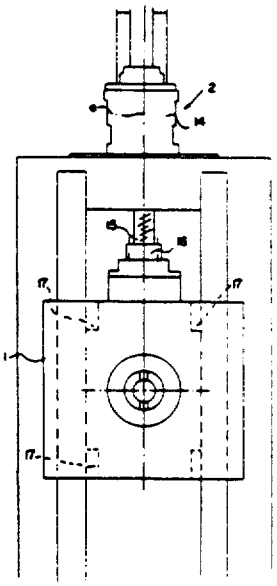

I claim:

1. In a machining center or machine tool comprising a spinglehead carrying a rotary spindle and a driving motor therefor, and means mounting said spindlehead for reciprocatory movement along a rectilinear path under the control of a recirculating-ball screw and nut assembly; the improvement in which the screw of said assembly is rigid with the spindlehead and has its axis passing through the center of gravity of the spindlehead and perpendicular to the axis of rotation of the spindle, said axes intersecting each other whereby the screw axis passes substantially through the point at which the resultant of all the forces and reactions applied to the spindlehead acts, motor means to rotate the nut of said assembly, and means to keep the nut of said assembly axially fixed during the rotation thereof.

2. Structure as claimed in claim 1, and a torque-limiting joint and a gear wheel transmission interconnecting said motor means and said nut.

3. Structure as claimed in claim 1, and a vertical support which supports said nut and motor means.

4. Structure as claimed in claim 1, and means fixing said screw against rotation, said fixing means comprising means slidably guiding said spindlehead for reciprocatory rectilinear movement.

* * * * *

UNITED STATES PATENT AND TRADEMARK OFFICE
CERTIFICATE OF CORRECTION

PATENT NO. : 4,842,457

DATED : June 27, 1989

INVENTOR(S) : Giuseppe Badagnani

It is certified that error appears in the above-identified patent and that said Letters Patent is hereby corrected as shown below:

The title page should be deleted to appear as shown on the attached title page.

Signed and Sealed this

Twelfth Day of February, 1991

Attest:

HARRY F. MANBECK, JR.

*Attesting Officer*   *Commissioner of Patents and Trademarks*

United States Patent [19]

Badagnani

[11] Patent Number: 4,842,457

[45] Date of Patent: Jun. 27, 1989

[54] MACHINE TOOL WITH IMPROVED SPINDLEHEAD MOUNTING AND TRAVERSING MEANS

[75] Inventor: Giuseppe Badagnani, San Giorgio Piacentino, Italy

[73] Assignee: Mandelli S.P.A., Piacenza, Italy

[21] Appl. No.: 84,906

[22] Filed: Aug. 12, 1987

[30] Foreign Application Priority Data

Sep. 10, 1986 [IT] Italy .................. 21657 A/86

[51] Int. Cl.⁴ .................. B23C 1/06; B23B 47/18; F16H 1/18
[52] U.S. Cl. .................. 400/183; 74/89.15; 408/137; 409/231
[58] Field of Search .......... 409/190, 191, 185, 231, 409/235, 183, 219, 184, 186; 408/129, 137; 29/568; 51/166 MH, 165.8; 74/89.15, 765, 841, 424.8; 83/318

[56] References Cited

U.S. PATENT DOCUMENTS

| | | | |
|---|---|---|---|
| 1,475,614 | 11/1923 | Williams | 51/166 MH |
| 2,882,741 | 4/1959 | Liebmann | 74/424.8 R |
| 3,455,207 | 7/1965 | Meinke | 409/190 |
| 3,640,147 | 2/1972 | Fantoni | 409/185 X |
| 3,665,805 | 5/1972 | Wolf | 409/190 |
| 3,768,364 | 10/1973 | Lancaster et al. | 409/190 |
| 3,803,928 | 4/1974 | Konkal et al. | 83/318 |
| 4,000,661 | 1/1977 | Menzel | 74/89.15 |
| 4,417,422 | 11/1983 | Redeker et al. | 51/50 R |
| 4,449,988 | 5/1984 | Redeker et al. | 51/165.8 |
| 4,510,668 | 4/1985 | Ishida et al. | 409/235 |
| 4,517,853 | 5/1985 | Tani et al. | 74/89.15 |

FOREIGN PATENT DOCUMENTS

| | | |
|---|---|---|
| 7014955 | 9/1970 | Fed. Rep. of Germany . |
| 2331347 | 1/1975 | Fed. Rep. of Germany . |
| 3248004 | 7/1983 | Fed. Rep. of Germany . |
| 3524879 | 7/1986 | Fed. Rep. of Germany . |
| 57-149132 | 9/1982 | Japan . |
| 2127332 | 4/1984 | United Kingdom ......... 409/184 |

OTHER PUBLICATIONS

"Entwicklung schwerer bahngesteuerter Fras-und Bohrwerke", *Werkstatt Und Betrieb*, 107 (1974) 7, By C. Ramusino et al., pp. 387–390.

*Primary Examiner*—William Briggs
*Attorney, Agent, or Firm*—Young & Thompson

[57] ABSTRACT

A machining center or machine tool comprises a bed, structure to support and position the workpieces, and a rotary spindle fed with worktools by an automatic tool changer and carried by a spindlehead which also carries the driving motor therefor. The spindlehead moves back and forth along a rectilinear path under the control of a circulating-ball screw and nut assembly, the screw of which is rigid with the spindlehead and has its axis intersecting that of the spindle. The lead nut of the same assembly is caused to rotate by a motor and is kept axially fixed.

4 Claims, 3 Drawing Sheets